(12) United States Patent
Bogdanski et al.

(10) Patent No.: US 6,543,832 B1
(45) Date of Patent: Apr. 8, 2003

(54) MODULAR VISOR

(75) Inventors: Richard T. Bogdanski, Canton, MI (US); Leslie R. Hinds, Oxford, MI (US)

(73) Assignee: Irvin Automotive Products, Inc., Auburn Hills, MI (US)

(*) Notice: Subject to any disclaimer, the term of this patent is extended or adjusted under 35 U.S.C. 154(b) by 0 days.

(21) Appl. No.: 10/091,261

(22) Filed: Mar. 4, 2002

(51) Int. Cl.$^7$ .................................................. B60J 3/02
(52) U.S. Cl. ..................................... 296/97.1; 296/97.6
(58) Field of Search ............................. 296/97.1, 97.6, 296/97.8

(56) References Cited

U.S. PATENT DOCUMENTS

| | | | | |
|---|---|---|---|---|
| 4,858,982 A | * | 8/1989 | Dykstra et al. ............ | 296/97.5 |
| 5,180,202 A | * | 1/1993 | Gabas ........................ | 296/97.9 |
| 5,374,097 A | * | 12/1994 | George et al. .............. | 296/97.5 |
| 5,810,421 A | * | 9/1998 | Kalkman et al. ........... | 296/97.5 |
| 6,024,399 A | * | 2/2000 | Viertel et al. ............. | 296/97.11 |

* cited by examiner

*Primary Examiner*—Joseph D. Pape
(74) *Attorney, Agent, or Firm*—Dinnin & Dunn, P.C.

(57) ABSTRACT

A vehicle sun visor comprises a plurality of attachable modular members with substantially equal heights. The plurality of members includes a base module and at least one extension module. The base module is pivotably attached to the roof of a vehicle interior, and is also attachable to the extension module. The at least one extension module may comprise a center module or an inner ear module, or an end or blank module. A single mounting pivot is provided, and is connected to the base module with a pivot member that is preferably a mounting rod. The visor body may be swiveled about the pivot to cover a portion of the vehicle windshield or, alternatively, a side window, and is further moveable between a downward position and an upward position.

23 Claims, 2 Drawing Sheets

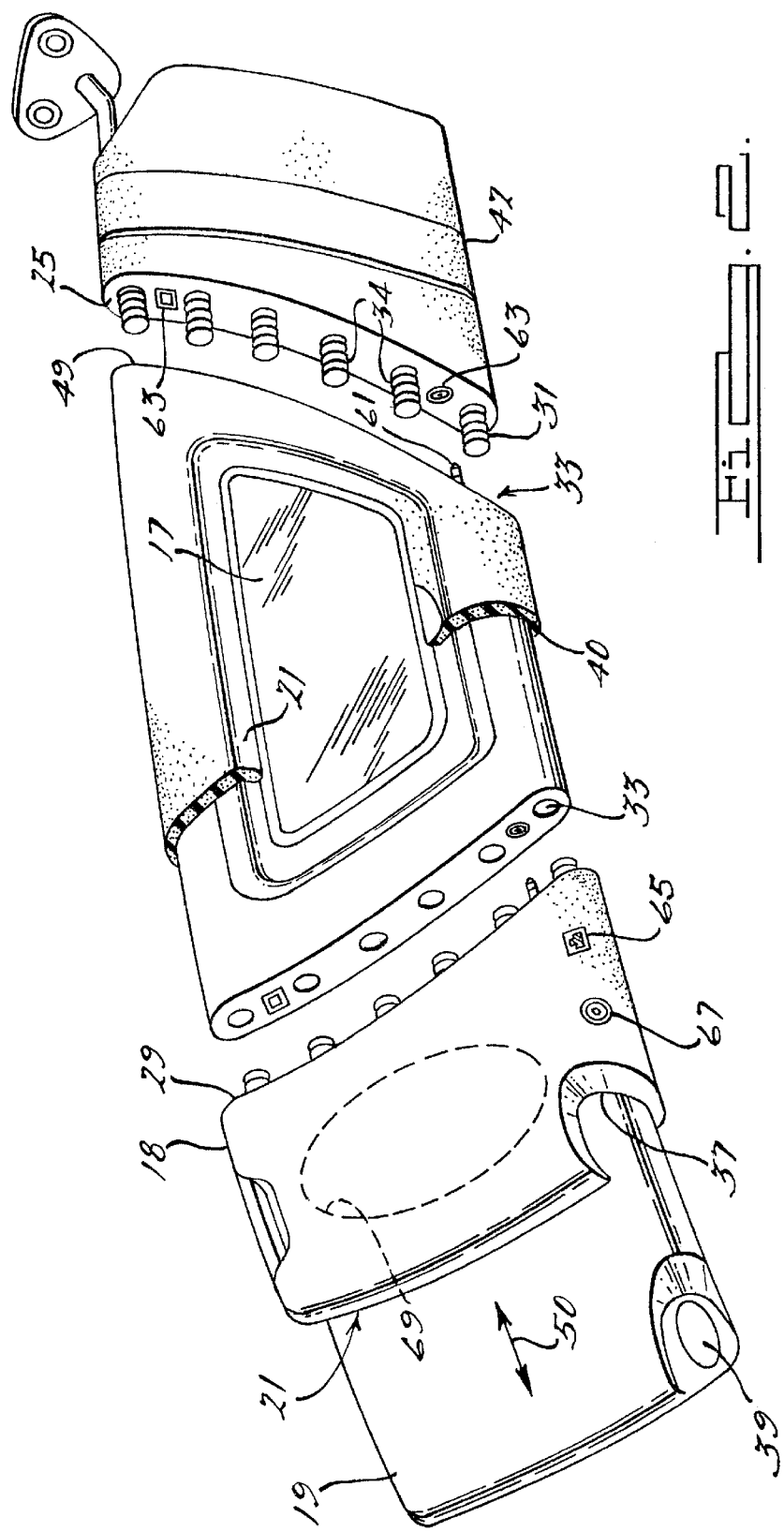

MODULAR VISOR

TECHNICAL FIELD

The present invention relates generally to visor assemblies for use in automotive vehicles, and more particularly to such an assembly comprising a plurality of attachable modular members.

BACKGROUND OF THE INVENTION

Sun visors are well known and widely used, and a great many designs have been successfully employed in vehicles over the years. Engineers have developed a variety of elegant ways by which visor bodies may be constructed and mounted in a vehicle. There has been and continues to be a premium in the automotive industry on cost savings. An area of particular focus is production cost, most particularly the labor cost in assembling a vehicle. It is much more cost effective to produce a multitude of identical vehicles compared to providing custom vehicles. Thus, there has been a perceived advantage to the use of identical or interchangeable installed components to speed up the assembly process and thus reduce cost.

A competing design criteria has become increasingly important in recent years, namely, to provide an increased variety of amenities to the vehicle owner and vehicle occupants. As aerodynamics and perceptions of style have compelled vehicle designers to produce vehicles that appear more and more similar, there is a greater emphasis on distinctive interior trim features and amenities. Of particular concern with respect to the present invention is the variety of features that can be associated with vehicle visors.

The primary purpose of the vehicle visor is to block the glare from the sun, whether direct or reflected, or from other light sources such as oncoming headlights. Much effort has been dedicated to methods of mounting visors to provide a mechanism that can be easily positioned by an vehicle passenger in a variety of positions depending on the location of the source of incoming light. These efforts include providing multiple visor panels and expandible or extendible panels, and a variety of pivotable or rotatable mountings.

Vehicles visors have also been widely used as a convenient location for passenger amenities, most particularly a vanity mirror. There is a substantial body of art relating to mirrors in visors and the apparatus for including a hinged cover for such mirrors and vanity lights for such mirrors. Additional amenities which have been included in visors include wireless phones, garage door opener signaling devices, organizers (i.e., receptacles for maps, combs, tissues, notepads, pens, etc.). With the advent of digital communications, digital image and sound recordings, voice recognition, and digital displays it is anticipated that the visor can be used to house an increasing variety of electronic components relating to onboard computing, communication or information display.

A trend in the automotive industry is to provide a discrete vehicle "model" with a limited variety of amenity packages. For example, there will be a base model with a lower level amenity package, a middle level or upgraded amenity package typically including more electronics, and a top level or deluxe amenity package which includes most or all of the amenities available. Although the profit to the manufacturer typically increases with each amenity level, it is still desirable to make production of each vehicle as uniform as possible to reduce costs.

There is also a substantial body of art relating to the specific structure or construction of the visor to provide a strong, lightweight construction that matches or compliments the vehicle interior trim in a cost effective manner. Of particular interest is the "clam shell" type construction which involves the molding of a single piece which is folded in half to form the visor. The exterior surface can be molded to provide a suitable visor surface or a desired covering can be added in a variety of ways.

What is lacking in the art is a visor design which allows the consumer to take full advantage of the various multitude of design advances in the visor art while providing the vehicle manufacturer the cost savings of a consistent visor mounting which can be repeated in each vehicle regardless of the visor amenities to be provided. In particular, there is no modular visor system which provides for a wide variety of visor features and styles upon a uniform or standard visor mount or base position.

U.S. Pat. No. 5,810,421 to Kalkman et al. is entitled a Multiple Function Visor, and includes a pair of opposed visor panels. Both of the panels in Kalkman are fixed to the vehicle roof, and are pivotable as individual units, allowing the panels to be brought together and fastened at opposing ends. When fastened thusly, the Kalkman visor may be manipulated as a single unit, however, one of its two attachments to the vehicle roof must first be disengaged.

U.S. Pat. No. 5,401,073 to Viertel et al. is entitled a Sun Visor For Vehicles With Mirror Attachment. Viertel provides a polypropylene particle foam body, and has a recess on a front face for attachment of a mirror-frame assembly.

U.S. Pat. No. 5,374,097 to George et al. is entitled a Universal Visor Mounting System. George provides a visor body with a medially positioned pocket for receipt of a curved blade-like frame. The frame is fixed to a vehicle roof, and is designed to attach to and support different visor bodies.

U.S. Pat. No. 5,180,202 to Gabas is entitled Sun Visor For Vehicles. Gabas provides a visor with a stiff plastic hollow base structure and two stiff plastic end members secured to opposite ends of a longitudinal edge of the base structure. The end members are used for mounting the visor to the vehicle roof, and are substantially smaller and narrower than the base structure itself.

SUMMARY OF THE INVENTION

In one aspect, a vehicle visor is provided. The visor comprises a visor body having a plurality of attachable modular body members. The plurality of attachable modular members includes a base body module and at least one extension body module. The plurality of modular body members include attachment means for endwise coupling to at least one adjacent modular body member. A single mounting member is provided for mounting the visor body to a vehicle body. Attached thusly, the visor body is swiverable about the single mounting member, and is further moveable between an upward stowed position, and a downward position in which it covers a portion of a vehicle window.

In another aspect, a visor assembly is provided comprising a segmented visor body having a plurality of visor body modules and mounted in a vehicle interior with a mounting member. The plurality of visor modules includes a base module positioned at an end of the segmented visor body and attached to the mounting member, and at least one extension module coupled to the base module. The plurality of visor modules each have at least one substantially straight mating edge coupled to a mating edge of an adjacent body module, wherein the coupling creates a unitary piece that is rotatable about the mounting member.

In still another aspect, a vehicle visor is provided. The visor comprises a modular base member having two mating edges, and is centrally positioned in an elongate segmented visor body. A plurality of modular extension body members are attached to the base member. A mounting member is provided and has a first end affixed to the modular base body member. The mounting member has a second end affixed to a structure in a vehicle interior. The visor body is swivelable in the vehicle interior, and is moveable between an upward stowed position, and a downward position in which it covers a portion of a vehicle window.

BRIEF DESCRIPTION OF THE DRAWINGS

FIG. 2 is an exploded front view of a modular visor according to a preferred embodiment of the present invention.

DETAILED DESCRIPTION

Figure 1:
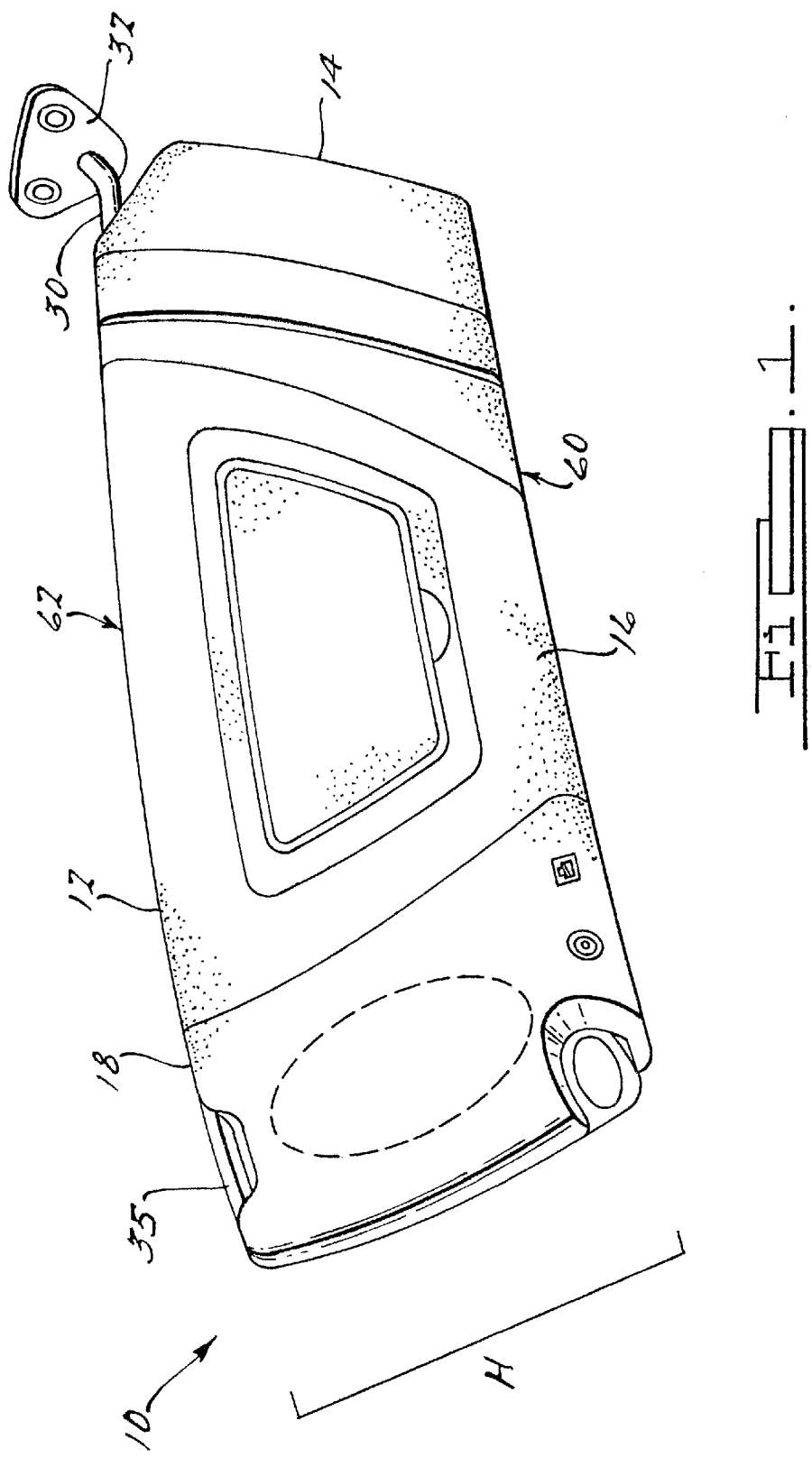
FIG. 1 is a front view of a modular visor assembly according to a preferred embodiment of the present invention.

Referring to FIG. 1, there is shown a vehicle sun visor 10 according to a preferred embodiment of the present invention. Visor 10 has a visor body 12 with a substantially planar face that is elongated relative to its height "H," and is constructed from a plurality of attachable modular members. In the preferred embodiment three modular members, or segments, make up visor body 12, each of the segments having substantially uniform thickness. The modular members include an outer ear segment or end body module 14 ("end module"), a center segment or center body module 16 ("center module"), and an inner ear segment or inner ear body module 18 ("inner ear module"). Any of the modules may serve as a base module, which is attached to a vehicle interior structure. Each of the modular members preferably have substantially equal heights H, and form a continuous lower longitudinal edge 60, as well as a continuous longitudinal upper edge 62, when attached. A pivot member, which is preferably a pivot rod 30, has one end attached to end module 14 or center module 16, and another end attached to a pivot base 32, and is mounted in a vehicle interior. Visor body 12 may be flipped between an upward position in which it is stored flush with the vehicle headliner (not shown), and a downward position in which it partially obscures the upper portion of a vehicle windshield. Visor body 12 may be manually rotated as a unit around pivot base 32, to block light through a vehicle side window. In the preferred embodiment, visor body 12 rotates about pivot rod 30 when it is moved between its upward and its downward position, although it should be appreciated that pivot rod 30 might itself rotate in pivot base 32. A clip rod 35 is preferably attached to inner ear module 18, and serves to secure visor body 12 to a clip fastened to the vehicle headliner that rotatably receives clip rod 35 in a snap-fit fashion.

Referring also to FIG. 2, there is shown an exploded view of the visor shown in FIG. 1. As illustrated in FIG. 2, a blade member 19 is slidably housed within a slot 21 in inner ear module 18, and movable between an extended position and a stowed position. The direction of sliding movement is represented by arrow 50. Blade member 19 should be a relatively rigid, thin plastic sheet, and is preferably substantially rectangular. Blade member 19 also preferably includes a ridged corner 39, which is accessible to a vehicle occupant via an arcuate cutout 37 when blade member 19 is in its stowed position. Thus, the ridged corner 39 of blade member 19 may be grasped by the driver or passenger, and blade member 19 can be pulled out of inner ear module 18 to extend the length of the visor. This is desirable, for instance, when the direction of incident sunlight is through a vehicle side window, and the occupant wishes to block a greater amount of light than that which is blocked by the module members alone. Inner ear module 18 is preferably attached to center module 16 at a mating edge or inboard side 29.

In FIG. 2, center module 16 illustrates the preferred interior construction and covering of visor body 12. Each module preferably includes a relatively rigid plastic frame, covered by an upholstery layer 40. The modules can be covered by a continuous upholstery layer, giving the appearance that the visor body is a single piece. Alternatively, they may be of a solid construction, colored and grained, to accent the center module. The profiles of the modules can be designed specifically for the headliner dimensions and swing requirements unique to a particular vehicle application without affecting the tooling of the base module. For example, an end body module with an arcuate widthwise cross section might be used in one application, while an end body module with a straight widthwise cross section might be used in another, depending on the contours of the headliner. The plastic frame may be injection molded, or may be constructed by another suitable method. Center module 16 also preferably includes a mirror 17 positioned within a recess 21. In one embodiment, described below, an electrical device such as a mirror lamp, map light, mobile phone charger, or radar detector may be included in center module 16.

End module 14 is attached to pivot rod 30, and preferably includes a flexible band 42, which is preferably made of a suitable rubber or synthetic elastic material. Maps, sunglasses, and other objects may be thrust into flexible band 42, and stored for later use. End module 14 also preferably includes a plurality of attachment pins 31, which are positioned along a mating edge 25. In the preferred embodiment, attachment pins 31 are paired with a set of complementary bores 33 in a second mating edge, or inboard side 49, of center module 16. Bores 33 should substantially correspond in shape and number to attachment pins 31. When assembly of visor body 12 is desired, the pins 31 on end module 14 are inserted into the bores 33 on center module 16, locking the two modules together at their respective mating edges 25, 49. Stated another way, the modular body members are coupled in an endwise manner. Pins 31 preferably have a series of concentric circumferential edges 34, positioned along the length of the pin, resulting in a roughened conical cross section. Bores 33 should be sized to matingly receive the pins 31 such that the concentric circumferential edges 34 tightly fit into the plastic bore 33, locking the pin therein, and preventing withdrawal. Those skilled in the art will appreciate that the positioning of the pins and bores described herein is not limiting. The location of the pins and bores might be reversed, and different modules might be produced having different locations and numbers of pins or bores without departing from the scope of the present invention. Once center module 16 is securely attached to end module 14, inner ear module 18 may be added to visor body 12 in a similar fashion along its mating edge 27, and the entire apparatus mounted in a vehicle.

The manner and order of component assembly described herein merely represents the preferred, not the sole, embodiment. Further, it should be appreciated that many different attachment means might be substituted for the mating pin-bore system without departing from the scope of the present invention. For example, one of the modular members might have a partially narrowed end that can be fit into a receiving sleeve in an adjacent modular member. Alternatively, one modular member might include a screw that is threadedly received in a bore in the adjacent modular member, or the modules could simply be bolted or clipped together. Two or more peripheral clips could be provided on an end of one segment which have tabs releasably engaging slots in the receiving segment. An adhesive might even be used to couple the modular members. In one embodiment of the present invention, shown in FIG. 2, one or more of the "pins" 61 connecting end body module 14 to center body module 16 includes a metallic conducting material which serves as an electrical contact. The pin 61 may be a coaxial, multi-pin, telephone, or some other type of connector, and it is contemplated that the electrical connection could be one capable of supplying electricity, or transmitting data. One or more complementary contacts 63 can be positioned within end body module 14 to connect the pin contact with the vehicle electrical system. From end module 14, a wire can be passed along the pivot rod 30 and into the vehicle roof, or it could even be threaded through the inside of pivot rod 30.

An additional pin-bore pair can serve as the return connection to complete the circuit or, as is the case with a multi-pin or coaxial connector, a single connecting pair may be sufficient. In such an embodiment, an electrical device, for example a light, can be positioned in the center module, the inner ear module, or even an additional extension module. It should be appreciated that some other electrical device, such as a cell phone charger, speaker phone, or a radar detector could be substituted for the light without departing from the scope of the present invention. In one embodiment, shown in FIG. 2, plugs such as a conventional telephone line plug 65 or a coaxial receptacle plug 67 are positioned in one of the modules. A vehicle occupant could use the plug as a connection port between, for example, a laptop computer and an onboard satellite-based internet connection. The module that contains the electrical device may be incorporated into the visor body at any point along its length; the device need not be housed in the center module. A plurality of visor modules could incorporate electrically conducting connecting pairs, delivering electrical power or transmitting data to and from a device several modules' length away from the end body module 14 and the connection to the vehicle electrical system.

The embodiment in which a multi-pin electrical connector is used facilitates the use of modules that include relatively complex electrical devices, requiring a plurality of electrical connections for supplying power as well as transmission of data between the device and, for example, an on-board computer. One such device is a display screen for a global positioning system ("GPS"), an increasingly popular accessory for vehicles. Pursuant to the present invention, a modular visor member having the screen could be connected to a GPS, giving the driver quick access to the desired data on the screen, yet allowing the visor to be flipped up out of the way when not needed. Other similar connections are contemplated for other data display devices such as information regarding the vehicle systems (mileage, temperature, etc.), internet connections, videophones, or even additional stereo and/or telephone speakers 69, as illustrated in the drawing Figures. The modular design allows a choice of a wide variety of optional equipment without altering the production cost of the base module.

Thus, according to the present invention, many different modules can be attached to the base module, creating a broad assortment of visor bodies, having different component modules and varying lengths. For instance, a visor body consisting of only the end module and an inner ear module might be constructed. "Blank" modules, without any extra components, might be substituted for the center module 16 or the inner ear module 18, or inserted in addition to those members. The use of blank modules might be particularly useful in applications where the additional cost of a mirror would be unnecessary or undesirable, such as a utility vehicle or truck. Similarly, manufacturers may find it desirable to include different components in a driver-side visor than a passenger-side visor. In lower-cost vehicles, or vehicle models with generally less costly components, for instance, a center module without a light might be used. Alternatively, in higher-end models an LCD display screen module, mobile phone charger module, and inner ear module with a blade extension might all be incorporated into the same visor body. The center module can be manufactured in standard sizes applicable to specific vehicle lines such as compact, midsize, or full size vehicles. As described, the present invention imparts a considerable degree of versatility to automotive visor body design, and is useful in numerous applications.

The present description is intended for illustrative purposes only, and should not be construed to limit the scope of the present invention in any way. Thus, those skilled in the art will appreciate that various modifications in addition to those described herein might be made to the presently disclosed embodiments without departing from the present invention's intended spirit and scope. Other aspects, features, and advantages of the instant invention will be evident upon examination of the attached drawing figures and appended claims.

What is claimed is:

1. A vehicle visor comprising:
   a substantially rigid visor body having a plurality of attachable modular body members, said plurality of attachable modular body members including a base body module and at least one extension body module, said plurality of modular body members each including attachment means for endwise coupling to at least one adjacent modular body member; and
   a single mounting member for mounting said visor body to a vehicle body such that said visor body is swivelable about said single mounting member, and moveable between an upward stowed position and a downward position in which it covers a portion of a vehicle window.

2. The vehicle visor of claim 1 wherein said at least one extension body module comprises a center body module and an inner ear body module.

3. The vehicle visor of claim 1 wherein said base body module is centrally positioned in said visor body.

4. The vehicle visor of claim 2 wherein said center body module includes a front face with an attached mirror.

5. The vehicle visor of claim 1 wherein said modular body members each have at least one mating edge; and
   said attachment means includes a plurality of attachment members positioned along a mating edge of one of said modular body members, wherein said plurality of attachment members are matingly received in a plurality of substantially complementary receptacles positioned along a mating edge on an adjacent modular body member.

6. A vehicle visor comprising:
   a visor body having a plurality of attachable modular body members, said plurality of attachable modular body members including a base body module, a center body module, and an inner ear body module having an extensible blade member, said plurality of modular body members each including attachment means for endwise coupling to at least one adjacent modular body member; and a single mounting member for mounting said visor body to a vehicle body such that said visor body is swivelable about said single mounting member, and moveable between an upward stowed position and a downward position in which it covers a portion of a vehicle window.

7. A vehicle visor comprising:

a visor body having a plurality of attachable modular body members, said plurality of attachable modular body members including a base body module and at least one extension body module, said plurality of modular body members each including attachment means for endwise coupling to at least one adjacent modular body member; and a single mounting member for mounting said visor body to a vehicle body such that said visor body is swivelable about said single mounting member, and moveable between an upward stowed position and a downward position in which it covers a portion of a vehicle window;

said base body module includes an electrical connector electrically connected to a vehicle electrical system; and at least one of said plurality of modular body members includes an electrical device and a set of electrical contacts, wherein incorporation of said at least one modular body member into said visor body completes an electrical circuit for supplying power to said at least one electrical device.

8. The vehicle visor of claim 7 wherein said electrical connector is a multi-pin plug.

9. The vehicle visor of claim 7 wherein said electrical connector is a coaxial plug.

10. The vehicle visor of claim 7 wherein said electrical device is an electronic display screen.

11. The vehicle visor of claim 7 wherein said electrical device is an audio device.

12. A visor assembly comprising:

a segmented visor body;

a plurality of visor body modules forming segments in said visor body;

said plurality of visor body modules includes a base body module positioned at an end of said segmented visor body, and at least one extension body module;

said plurality of visor body modules each have at least one substantially straight mating edge coupled to a mating edge of an adjacent body module;

coupling of said body modules creates a substantially rigid unitary piece having a substantially planar face.

13. The visor assembly of claim 12 further comprising a visor body module having an electrical connector.

14. The visor assembly of claim 12 further comprising a visor body module having an electrical device.

15. The vehicle visor of claim 12 wherein said at least one extension body module comprises an inner ear body module mounted at an end of said visor body.

16. The visor assembly of claim 12 wherein said plurality of visor body modules includes three members.

17. The visor assembly of claim 12 wherein said plurality of visor body modules includes two members.

18. A vehicle visor comprising:

an elongate segmented visor body;

a modular base member having two mating edges and being centrally positioned in said elongate segmented visor body;

at least one modular body extension member attached to said modular base member;

a mounting member having a first end affixed to said modular base member, and a second end affixed to a structure in a vehicle interior, wherein said visor body is swivelable in said vehicle interior, and moveable between an upward stowed position and a downward position in which it covers a portion of a vehicle window.

19. The vehicle visor of claim 18 wherein said plurality of modular extension body members includes an inner ear body module with one mating edge, and including a clip rod for securing said visor body to a clip in a vehicle interior in a snap-fit relationship.

20. The vehicle visor of claim 18 further comprising an electrical device mounted in said elongate segmented visor body.

21. A modular visor body having a substantially planar face which is elongated laterally relative to its height, and having a substantially uniform thickness along its length, said modular visor body comprising a plurality of body segments each having a lateral attachment edge, said lateral attachment edges having mating mechanical connectors, mating electrical connectors and having substantially equal height.

22. The modular visor body of claim 21 wherein said plurality of body segments includes two such segments.

23. The modular visor body of claim 21 wherein said plurality of body segments includes three such segments.

* * * * *